United States Patent
US 11,372,828 B1
Bendapudi
(45) Date of Patent: Jun. 28, 2022

(54) METHODS AND SYSTEMS FOR DATA MIGRATION BASED ON METADATA MAPPING

(71) Applicant: RITE SOFTWARE SOLUTIONS AND SERVICES LLC, Houston, TX (US)

(72) Inventor: Krishna Bendapudi, Houston, TX (US)

(73) Assignee: Rite Software Solutions and Services LLC, Houston, TX (US)

( * ) Notice: Subject to any disclaimer, the term of this patent is extended or adjusted under 35 U.S.C. 154(b) by 0 days.

(21) Appl. No.: 17/405,981

(22) Filed: Aug. 18, 2021

(51) Int. Cl.
G06F 16/21 (2019.01)
G06F 16/25 (2019.01)
G06F 16/22 (2019.01)

(52) U.S. Cl.
CPC ........ G06F 16/214 (2019.01); G06F 16/2282 (2019.01); G06F 16/258 (2019.01)

(58) Field of Classification Search
None
See application file for complete search history.

(56) References Cited

U.S. PATENT DOCUMENTS

| | | | |
|---|---|---|---|
| 6,604,110 B1 * | 8/2003 | Savage | G06F 16/254 707/602 |
| 7,509,327 B2 | 3/2009 | Joshi et al. | |
| 8,285,762 B2 | 10/2012 | Cannon et al. | |
| 8,667,248 B1 | 3/2014 | Neppalli | |
| 9,223,570 B2 | 12/2015 | Kannan | |
| 9,529,933 B2 | 12/2016 | Hazlewood et al. | |
| 10,545,913 B1 | 1/2020 | Liao et al. | |
| 10,838,821 B2 | 11/2020 | Bhagi et al. | |
| 10,909,094 B1 | 2/2021 | Kumar et al. | |
| 11,055,010 B2 | 7/2021 | Surla et al. | |
| 11,093,442 B1 | 8/2021 | Bhutani et al. | |
| 2019/0138509 A1 * | 5/2019 | von Rickenbach | G06F 16/285 |
| 2019/0147087 A1 * | 5/2019 | Mart | G06F 16/2454 707/713 |
| 2020/0159746 A1 * | 5/2020 | Suriarachchi | G06F 16/2379 |
| 2021/0034589 A1 * | 2/2021 | Mathur | G06F 16/2358 |
| 2021/0056264 A1 * | 2/2021 | Malak | G06N 3/0454 |
| 2021/0318995 A1 * | 10/2021 | Portisch | G06F 16/211 |

* cited by examiner

Primary Examiner — Wilson Lee
(74) Attorney, Agent, or Firm — Kanika Radhakrishnan; Evergreen Valley Law Group

(57) ABSTRACT

Computer-implemented methods and systems for migrating business data from source business system to target business system are described. The method performed by server system includes receiving request from user device to migrate source data from source business system to target business system and accessing source metadata associated with source business system and target metadata associated with target business system. The method includes generating one or more source staging tables based on source metadata. The one or more source staging tables include information of a plurality of source columns that is to be mapped. The method includes creating mapping sets for mapping source data to the target metadata, transforming the source data stored in the one or more source staging tables into a target data structure based on the target metadata, and loading a target staging table associated with target business system based, at least in part, on the transforming step.

20 Claims, 9 Drawing Sheets

| TABLE NAME 402 | COLUMN_NAME 404 | USER_COLUMN_NAME 406 | COLUMN_WIDTH 408 | | NULL_ALL | TRAN-SLAT | FLEX-FLIED | DESCRIPTION |
|---|---|---|---|---|---|---|---|---|
| XXR_SUPPLIERS | PARTY_NUMBER | PARTY_NUMBER | 1 | V | N | N | N | PARTY_NUMBER |
| XXR_SUPPLIERS | VENDOR_ID | VENDOR_ID | 2 | N | N | N | N | VENDOR_ID |
| XXR_SUPPLIERS | VENDOR_NAME | VENDOR_NAME | 3 | V | Y | N | N | VENDOR_NAME |
| XXR_SUPPLIERS | VENDOR_NUM | VENDOR_NUM | 4 | V | N | N | N | VENDOR_NUM |
| XXR_SUPPLIERS | VENDOR_NAME_ALT | VENDOR_NAME_ALT | 5 | V | Y | N | N | VENDOR_NAME_ALT |
| XXR_SUPPLIERS | ONE_TIME_FLAG | ONE_TIME_FLAG | 6 | V | Y | N | N | ONE_TIME_FLAG |
| XXR_SUPPLIERS | VENDOR_TYPE_LOOKUP_CODE | VENDOR_TYPE_LOOKUP_CODE | 7 | V | Y | N | N | VENDOR_TYPE_LOOKUP_CODE |
| XXR_SUPPLIERS | ORGANIZATION_TYPE_LOOKUP_CODE | ORGANIZATION_TYPE_LOOKUP_CODE | 8 | V | Y | N | N | ORGANIZATION_TYPE_LOOKUP_CODE |
| XXR_SUPPLIERS | END_DATE_ACTIVE | END_DATE_ACTIVE | 9 | D | Y | N | N | END_DATE_ACTIVE |
| XXR_SUPPLIERS | CUSTOMER_NUM | CUSTOMER_NUM | 10 | V | Y | N | N | CUSTOMER_NUM |
| XXR_SUPPLIERS | NUM_1099 | NUM_1099 | 11 | V | Y | N | N | NUM_1099 |
| XXR_SUPPLIERS | TYPE_1099 | TYPE_1099 | 12 | V | Y | N | N | TYPE_1099 |
| XXR_SUPPLIERS | STANDARD_INDUSTRY_CLASS | STANDARD_INDUSTRY_CLASS | 13 | V | Y | N | N | STANDARD_INDUSTRY_CLASS |
| XXR_SUPPLIERS | TAX_VERIFICATION_DATE | TAX_VERIFICATION_DATE | 14 | D | Y | N | N | TAX_VERIFICATION_DATE |
| XXR_SUPPLIERS | NAME_CONTROL | NAME_CONTROL | 15 | V | Y | N | N | NAME_CONTROL |
| XXR_SUPPLIERS | STATE_REPORTABLE_FLAG | STATE_REPORTABLE_FLAG | 16 | V | Y | N | N | STATE_REPORTABLE_FLAG |
| XXR_SUPPLIERS | FEDERAL_REPORTABLE_FLAG | FEDERAL_REPORTABLE_FLAG | 17 | V | Y | N | N | FEDERAL_REPORTABLE_FLAG |

Note: COLUMN_WIDTH 408 values: 30, 22, 240, 30, 320, 1, 30, 25, 7, 25, 30, 10, 25, 7, 4, 1, 1

SOURCE TEMPLATE WORKBENCH

[ Q SEARCH ]  [ + NEW ]  [ 💾 SAVE ]  [ + CREATE TABLE ]  [ ⬇ IMPORT COLUMNS ]  [ ☐ BASELINE ]  [ 🗄 LOAD DATA ]  [ 📋 COPY ]

[ ⬇ EXPORT CSV ]

TEMPLATE HEADER

| TEMPLATE NAME | POD | PROJECT NAME | PARENT OBJECT CODE | OBJECT CODE | METADATA TABLE NAME |
|---|---|---|---|---|---|
| SUPPLIER_C | DEVELOPMENT | EAGLE | SUPPLIER | SUPPLIER | XXR_SUPPLIERS |

| STAGING TABLE NAME | VIEW NAME | BU SPECIFIC | BU |
|---|---|---|---|
| XXR_SUPPLIER_245 | XXR_C_SUPPLIER_245_V | ☑ | |

TEMPLATE LINES

| # ↕ | COLUMN NAME 504 ↕ | SELECTION 506 ↕ | ORIG TRANS REF 508 ↕ | MAPPING TYPE 510 ↕ | MAPPING SET NAME ↕ | MAPPING VALUE ↕ | SEQ ↕ | START DATE ↕ | END DATE ↕ | ENABLE ↕ |
|---|---|---|---|---|---|---|---|---|---|---|
| 1 | PARTY_NUMBER | ✓ | | AS-IS | | | | | | |
| 2 | VENDOR_NUMBER | ✓ | ✓ | AS-IS | | | | | | |
| 3 | VENDOR_ID | ✓ | ✓ | AS-IS | | | | | | |
| 4 | ALIAS | ✓ | | AS-IS | | | | | | |
| 5 | ALLOW_AWT_FLAG | ✓ | ✓ | AS-IS | | | | | | |
| 6 | ATTRIBUTE1 | ✓ | | AS-IS | | | | | | |
| 7 | ATTRIBUTE10 | ✓ | | AS-IS | | | | | | |

DEFINE MAPPING SET

MAPPING SET HEADER

| MAPPING NAME | | POD | PROJECT NAME | PARENT OBJECT CODE |
|---|---|---|---|---|
| VENDOR_TYPE_LOOKUP_CC | | UAT | PHONEIX | SUPPLIER |

| MAPPING TYPE | | | | WHERE CLAUSE |
|---|---|---|---|---|
| ONE TO ONE | | | | |

| SOURCE OBJECT 1 | SOURCE OBJECT 2 | SOURCE OBJECT 3 | OBJECT CODE | CLOUD COLUMN |
|---|---|---|---|---|
| XXR_SUPPLIER_245 | | | SUPPLIER | VENDOR_TYPE_LOOKUP_C |

| | | | | LOOKUP TYPE |
|---|---|---|---|---|
| | | | | POZ_VENDOR_TYPE |

MAPPING SET VALUES | + NEW

| # | SOURCE FIELD 1 | SOURCE FIELD 2 | SOURCE FIELD 3 | CLOUD VALUE | ENABLE |
|---|---|---|---|---|---|
| | 704 | | | 706 | |
| 1 | EXCISE IND | | | SERVICES | ✓ |
| 2 | SUPPLIER | | | SUPPLIER | ✓ |
| 3 | MANUFACTURING | | | MANUFACTURING | |
| 4 | INTERNAL | | | INSURANCE | ✓ |
| 5 | UTILITY | | | UTILITY | ✓ |
| 6 | INSURER | | | INSURANCE | ✓ |

FIG. 7

METHODS AND SYSTEMS FOR DATA MIGRATION BASED ON METADATA MAPPING

TECHNICAL FIELD

The present invention relates to the field of data management and, more particularly to, electronic methods and complex processing systems for migrating source data from a source business system (e.g., Enterprise Resource Planning (ERP) systems) to a target business system (e.g., Oracle Cloud Applications).

BACKGROUND

Companies may need to migrate data from an existing business system (such as, Enterprise Resource Planning (ERP), Financial System, Human Resource Information System (HRIS)) to a new or updated business system. The company administrators need to perform migration of a tremendous amount of data (items, customers, suppliers, account balances, personnel, etc.) from legacy business systems to the new business system. The companies often choose to clean or reorganize the business data at the time of migration. Sometimes, the business data of the legacy business system may include unwanted errors in it. As the starting point for every company is different (different prior systems, different data structures, etc.), the current approach is manual and bespoke for each company. These approaches require mapping of each source to a destination and building custom scripts or programs for each data migration. Further, the business data in the legacy business systems never exactly match the fields, elements, formats, etc. of the new business system, therefore, the business data must be mapped, transformed, and manipulated to be fed into the new business system.

Therefore, there is a need for techniques to overcome one or more limitations stated above in addition to providing other technical advantages.

SUMMARY

Various embodiments of the present disclosure provide methods and systems for migrating business data from a source business system to a target business system.

In an embodiment, a computer-implemented method is disclosed. The computer-implemented method performed by a server system includes receiving a request from a user device to migrate source data from a source business system to a target business system, and accessing source metadata associated with the source business system and target metadata associated with the target business system. The method includes generating one or more source staging tables based, at least in part, on the source metadata. The one or more source staging tables include information of a plurality of source columns that is to be mapped. The method includes creating mapping sets for mapping the source data to the target metadata and transforming the source data stored in the one or more source staging tables into a target data structure based, at least in part, on the target metadata. The method further includes loading, by the server system, a target staging table associated with the target business system based, at least in part, on the transforming step.

BRIEF DESCRIPTION OF THE FIGURES

For a more complete understanding of example embodiments of the present technology, reference is now made to the following descriptions taken in connection with the accompanying drawings in which:

FIG. 4 shows an example representation of metadata table of a source business system (e.g., ERP system), in accordance with an embodiment of the present disclosure;

FIG. 5 shows a graphical user interface (GUI) for creating a source staging table based on the metadata of the source business system, in accordance with an embodiment of the present disclosure;

FIG. 7 shows a graphical user interface (GUI) for displaying mapping sets, in accordance with an embodiment of the present disclosure;

Figure 1:
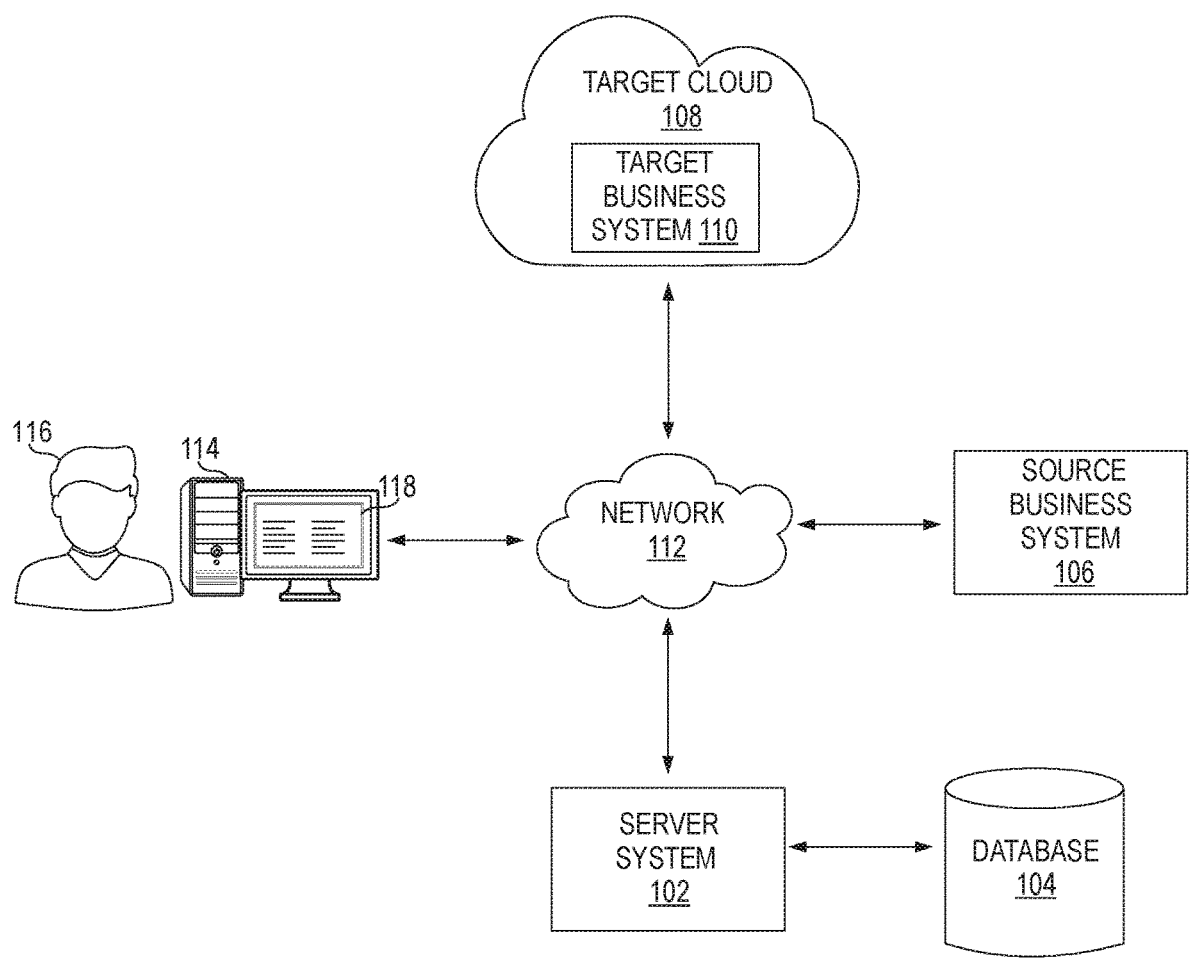
FIG. 1 is an example representation of an environment related to at least some examples of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various embodiments of the present disclosure provide methods, systems electronic devices and computer program products for business data migration from a source business system to a target business system. The present disclosure discloses template-based metadata mapping between the source business system and the target business system (e.g., Oracle Cloud Applications). The present disclosure enables elimination of the highly technical coding component of a migration process and the average business user to use configuration to map data from source business system to destination business system.

In an example, the present disclosure describes a server system that automates migration of source data of a source business system to a target business system (e.g., Oracle Cloud Applications). The server system includes at least a processor and a memory. The server system is a backend server of a data migration application. The application enables metadata mappings between source data of the source business system and target business system for data conversion. The server system accesses metadata corresponding to the source data and the target oracle cloud. The application creates a source staging table based on the source metadata and a target staging table based on the target metadata. The application loads the source data in the source staging table. The application then maps the source data from the source staging table using a target master data definition stored in the application. Validation of correct data transformation is done at this step. The data is then transformed as necessary and stored in the target staging table. The application reads the current target application version and associated metadata field sequencing to create a file ready for upload to the target cloud application. To verify successful migration to the target business system, the application facilitates reconciliation and validation steps after the data transfer.

Without in any way limiting the scope, interpretation, or application of the claims appearing below, technical effects of one or more of the example embodiments disclosed herein is as follows: (a) Save time and resource days compared to current solutions, (b) Repeatable process—for multiple test iterations, (c) Flexible platform agnostic general solution for all data conversion objects, (d) Backend scripts are not necessary to be custom developed and tested, (e) Pre-built connectors for many source systems and flexible enough to connect to any legacy system for any data conversion object, and (f) Clear auditability of data migration for compliance purposes. Hence, the present disclosure performs source business system agnostic data conversion method.

Various example embodiments of the present disclosure are described hereinafter with reference to FIGS. 1 to 9.

FIG. 1 is an example representation of an environment 100 related to at least some examples of the present disclosure. Although the environment 100 is presented in one arrangement, other embodiments may include the parts of the environment 100 (or other parts) arranged otherwise depending on, for example, performing migration of business data from a source business system to a target business system using mapped metadata, etc. The environment 100 generally includes a server system 102, a database 104, a source business system 106, a target business system 110 associated with a target cloud 108, a user device 114 associated with a user 116, each coupled to, and in communication with (and/or with access to) a network 112. The network 112 may include, without limitation, a light fidelity (Li-Fi) network, a local area network (LAN), a wide area network (WAN), a metropolitan area network (MAN), a satellite network, the Internet, a fiber-optic network, a coaxial cable network, an infrared (IR) network, a radio frequency (RF) network, a virtual network, and/or another suitable public and/or private network capable of supporting communication among the entities illustrated in FIG. 1, or any combination thereof.

Various entities in the environment 100 may connect to the network 112 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. For example, the network 112 may include multiple different networks, such as a private network made accessible by server system 102, database 104, source business system 106, and target business system 110, separately, and a public network (e.g., the Internet, etc.).

Examples of the source business system 106 may include, but are not limited to, enterprise resource planning (ERP) system, human resource information system (HRIS), customer relationship management (CRM) system, master data management (MDM) systems, supply chain management (SCM) systems, etc. In one embodiment, the source business system 106 may include a cloud computing environment in which data, applications, services or other resources are stored and delivered through shared data sources and appear as a single point of access for the users.

In one embodiment, the target business system 110 may be incorporated within a target cloud 108 (for example, Oracle Cloud). The target business system 110 may implement Oracle applications such as, Enterprise Resource Planning (ERP) cloud, Human Capital Management (HCM) cloud, Supply Chain Management (SCM) cloud, Project Portfolio Management (PPM) cloud, etc.

However, it is noted that the source business system 106 and the target business system 110 can be any of a wide variety of other data systems as well, but they are described herein as ERP systems for the sake of example.

In one embodiment, the source business system 106 may store source data in a source database (not shown in figure). The source data includes one or more source entity records. The source entity records may include wide variety of different types of entities such as, customer entity, invoice entity, employee entity, asset entity, financials entity, payroll entity, bills of material entity, etc. Each source entity record may include multiple data fields and relations to other data fields.

In one example, to convert supplier data stored in the source business system 106 to the target business system 110, the server system 102 may need to convert:

Supplier Name
Addresses, often multiple
Supplier Sites, often multiple
Supplier Site Assignments
Supplier Contacts, multiple
Supplier Contact Addresses
Supplier Attachments
Supplier Business Classifications
Supplier Products and Services and
Supplier Third-Party Relationships.

The user device 114 associated with the user 116 may include, without limitation, smart phones, tablet computers, other handheld computers, wearable devices, laptop computers, desktop computers, servers, portable media players, gaming devices, and so forth. In general, the user device 114 can provide access to different content, for instance, content provided by the source business system 106. In an embodiment, each user device may host or execute one or more client applications that are capable of interacting with the source business system 106.

In one embodiment, the user device 114 may be equipped with an instance of a software application, such as data migration application 118. The data migration application 118 is configured to migrate data stored in the source business system 106 to the target business system 110 (for example, Oracle Applications). In one embodiment, the data migration application 118 is a web-based application residing on Oracle infrastructure.

For instance, the data migration application 118 maybe or include a web browser which a user may navigate to one or more websites or other resources provided by the source business system or the target business system. As another example, a data migration application may include a mobile application or "app". For example, an operator of an organization associated with the user 116 may make available one or more mobile apps that enable users of user devices to migrate data files of ERP systems to Oracle cloud applications. As yet another example, the data migration application 118 may include background processes that perform various operations without direct interaction from a user. A data migration application 118 may include a "plug-in" or "extension" to another application, such as a web browser plug-in or extension. The data migration application 118 is configured to display various graphical user interfaces to the user 116 for migrating data to the target business system 110 from the source business system 106. The data migration application 118 provides a structured process, task management, and status dashboard for the data Migration effort of system implementation. In particular, the data migration application 118 is configured to set up an interface between the source and target business systems for data migration.

In addition, the server system 102 should be understood to be embodied in at least one computing device in communication with the network 112, which may be specifically configured, via executable instructions, to perform as described herein, and/or embodied in at least one non-transitory computer-readable media. The data migration application 118 is an application/tool resting at the server system 102.

In an embodiment, the server system 102 may implement the backend APIs corresponding to the data migration application 118 which instructs the server system 102 to perform one or more operations described herein. In one example, the server system 102 is configured to enable metadata mappings between the source business system 106 and the target business system 110. This approach eliminates the need to build technical scripting code for transforming and migrating each unique source record. By creating a new "template" for each new "source" and "destination", the mapping between both will be dramatically simplified and be easily repeatable.

The number and arrangement of systems, devices, and/or networks shown in FIG. 1 is provided as an example. There may be additional systems, devices, and/or networks; fewer systems, devices, and/or networks; different systems, devices, and/or networks; and/or differently arranged systems, devices, and/or networks than those shown in FIG. 1.

Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) of the environment 100 may perform one or more functions described as being performed by another set of systems of the environment 100.

Figure 2:
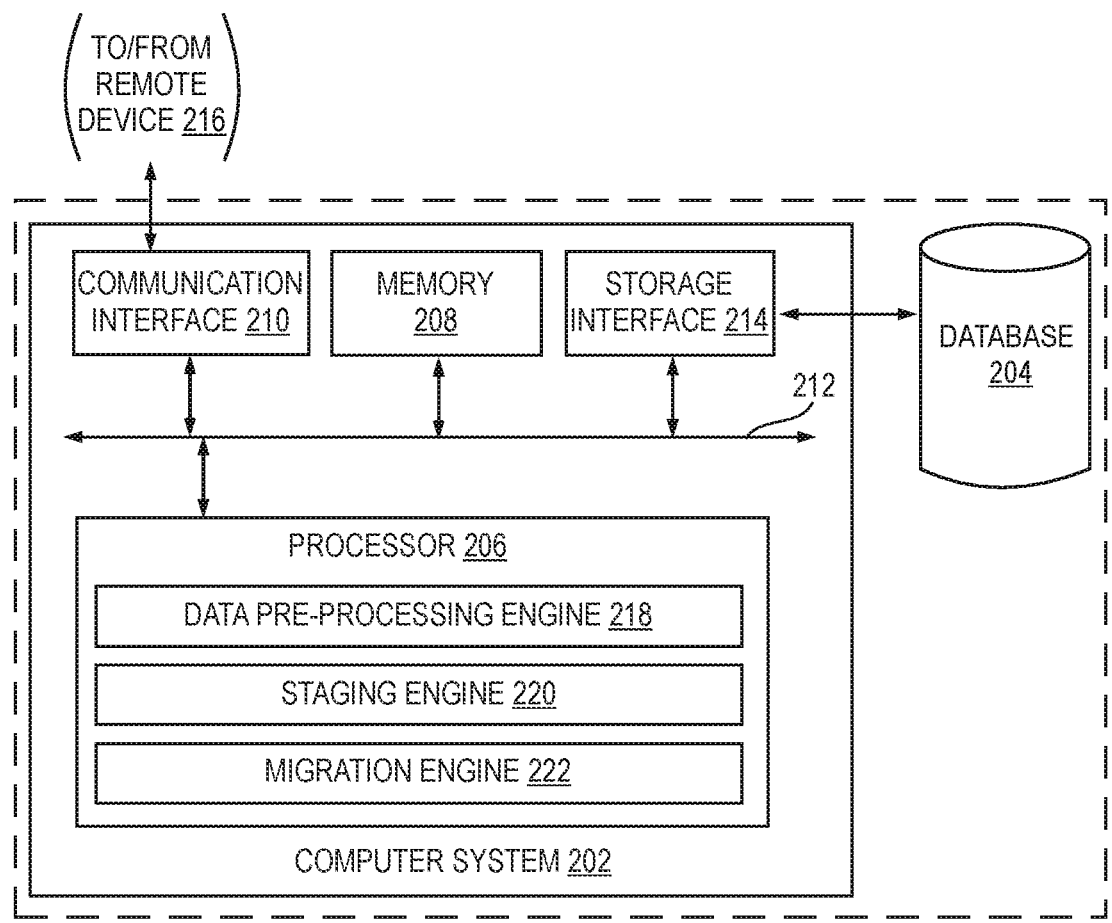
FIG. 2 is a simplified block diagram representation a server system, in accordance with an embodiment of the present disclosure.

FIG. 2 is a simplified block diagram of a server system 200, in accordance with an embodiment of the present disclosure. For example, the server system 200 is similar to the server system 102 as described in FIG. 1. In some embodiments, the server system 200 is embodied as a cloud-based, PaaS (Platform as a Service), and/or SaaS-based (software as a service) architecture. The server system 200 is configured to migrate source data associated with a source business system 106 to a target business system 110 based on metadata based mapping.

In one embodiment, the server system 200 includes a computer system 202 and a database 204 (i.e., it is similar to the database 104 as shown in FIG. 1). The computer system 202 includes at least one processor 206 for executing instructions, a memory 208, and a communication interface 210. The one or more components of the computer system 202 communicate with each other via a bus 212.

In one embodiment, the database 204 is integrated within the computer system 202. For example, the computer system 202 may include one or more hard disk drives as the database 204. A storage interface 214 is any component capable of providing the processor 206 with access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

The processor 206 includes suitable logic, circuitry, and/or interfaces to execute computer-readable instructions for facilitating the migration of source data associated with the source business system 106 to the target business system 110 using metadata based mapping. Examples of the processor 206 include, but are not limited to, an application-specific integrated circuit (ASIC) processor, a graphical processing unit (GPU), a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the server system 200, as described herein. In some embodiments, the memory 208 may be realized in the form of a database server or a cloud storage working in conjunction with the server system 200, without deviating from the scope of the present disclosure.

The processor 206 is operatively coupled to the communication interface 210 such that the processor 206 is capable of communicating with remote device 216 such as the source business system 106, target business system 110, the user device 114, etc. or with any entity connected to the network 112 (e.g., as shown in FIG. 1).

It is noted that the server system 200 as illustrated and hereinafter described is merely illustrative of an apparatus that could benefit from embodiments of the present disclosure and, therefore, should not be taken to limit the scope of the present disclosure. It is noted that the server system 200 may include fewer or more components than those depicted in FIG. 2.

In one embodiment, the processor 206 includes a data pre-processing engine 218, a staging engine 220, and a migration engine 222. It should be noted that components, described herein, can be configured in a variety of ways, including electronic circuitries, digital arithmetic and logic blocks, and memory systems in combination with software, firmware, and embedded technologies.

In one embodiment, the processor 206 is configured to receive a request from the user device 114 for migrating source data from the source business system 106 and the target business system 110.

Upon receiving the request, the data pre-processing engine 218 includes a suitable logic and/or interfaces for accessing source metadata associated with the source business system 106 and the target business system 110. The source metadata is accessed by sending a query request to identify a metadata table associated with the source business system 106. The source metadata may include details such as table and column names associated of the source data based on source object identifier (for example, Supplier).

For example, metadata table represents source objects of 10 different supplier data that the user 116 specified for data migration. The metadata table may include pointers to different content tables, column definitions, etc. After the data pre-processing engine 218 retrieves the metadata table for the 10 supplier data objects from the source business system 106, the data pre-processing engine 218 stores the metadata table as Java Script Object Notation (JSON) metadata in the metadata table.

In one embodiment, the data pre-processing engine 218 retrieves the metadata table via the database's object view on a table-by-table basis based on source template. In another embodiment, the data pre-processing engine 218 is configured to retrieve metadata in automatic manner by using pre-configured adapters for business systems.

In similar manner, the data pre-processing engine 218 is configured to load target metadata of the target business system 110.

The staging engine 220 includes a suitable logic and/or interfaces for generating one or more source staging tables and source template based, at least in part, on the source metadata. In other words, the one or more source staging tables are created based on source metadata loaded into the data migration application 118. The technical objective of creation of a staging table is to create a uniform data structure that can be migrated later into the target cloud application. This is necessary as the source data could come from many different source applications that use different conventions.

The source staging tables contain a replica of the source data to be migrated. The data in the source staging table data structure and format is defined by the metadata definitions loaded based on the source business system. The cloud staging table is stored in the database 204 and is a replica of a cloud interface table. The cloud staging table is used as an intermediary table that allows to manipulate data to conform to the prescribed format on application side. The cloud interface table is owned/used by oracle for the final import into the cloud application tables.

More illustratively, the staging engine 220 is configured to map between the source data and the one or more source staging tables that are defined according to a staging data structure. For example, the staging engine 220 may generate a mapping between the source data and staging data structure and populate the source data from source entity records to the mapped staging data structure. In one embodiment, the staging engine 220 is configured to load the source data into the one or more source staging tables using pre-configured adaptors. The staging engine 220 may implement object loader-REST API methods to populate the source data into the one or more source staging tables.

The one or more source staging tables indicate source columns that are to be mapped in the target business system.

In particular, the staging engine 220 is configured to create script-free source staging tables, resulting in script-free data migration from the source business system 106 to the target business system 110. This approach eliminates the need to build technical scripting code for the user for transforming and migrating each unique source data.

The staging engine 220 creates structure-agnostic source staging tables that can be used for migrating data from the source business system 106 to the target business system 110. Similarly, the staging engine 220 also creates cloud staging tables associated with the target business system 110.

The migration engine 222 includes a suitable logic and/or interfaces for mapping target column names of the target business system 110 to source column names of the source business system 106. The mapping is performed based on the one or more source staging tables. The mapping may be done using at least one of mapping methods including, but not limited to, as is mapping, one to one mapping, two to one mapping, three to one mapping, SQL formula based mapping, constant mapping, prefix mapping, suffix mapping, and the like.

The migration engine 222 is configured to create mapping sets of the target business system 110 for mapping the source metadata to the target metadata associated with the target business system 110. In particular, the migration engine 222 is configured to generate the mapping sets that maps the copy of a source object included in the source metadata to a target object included in the target metadata. If the object types in the source metadata are to be morphed into different object types that are to be stored as the target metadata, the migration engine 222 executes a transformation tool to transform these object types to be morphed and migrated.

The migration engine 222 is also configured to validate and convert the source data into target data structure. The validation includes validating the source data based on the mapping sets and the target metadata. The mapping sets and the target metadata are compared and based on the comparison, the source data is validated. The result of the validation may be successful or failure. If the validation is failed, the migration engine 222 is configured to map the source data again and refresh the mapping until the validation is successful.

Once the validation is successful, the migration engine 222 is configured to convert or transform the source data stored in the one or more source staging tables into the target data structure. The target data structure includes tables and columns according to the target metadata. The migration engine 222 is configured to load a target staging table upon the successful transformation and generate field sequencing based on target business system's accepted format. The target staging table is created based on the metadata of the cloud interface table. The metadata of the required table structure is retrieved programmatically based on the object that is being converted, such as supplier. The target business system 110 (for example, Oracle cloud) uses file-based data import (FBDI) or HDL formats. The metadata of these formats are published by the target business system 110 and is dependent on the version of the cloud software. In these formats, the target business system 110 requires the field names for columns and a prescribed order (sequence) of the columns for import. The data migration application automatically fetches the current control file that contains the required sequence from the target business system 110 and configures the staging tables appropriately. Without the data migration application, the end user would have to research this sequence and build their own scripts to match it.

The converted source data may be ready to be stored in the target data structure. The migration engine 222 is further configured to generate and transport target data files into a database associated with the target business system 110 based, at least in part, on the target staging table and an interface table. The process of validation and conversion is script-free and repeatable since source staging tables for a particular source business system remains same and can be re-used multiple times.

Further, the migration engine 222 enables reviewing of the data in each of the source staging tables and the target data structure. The migration engine 222 is configured to determine the reason for failure of the validation and generate a table containing the failures and the reason for failures.

Figure 3:
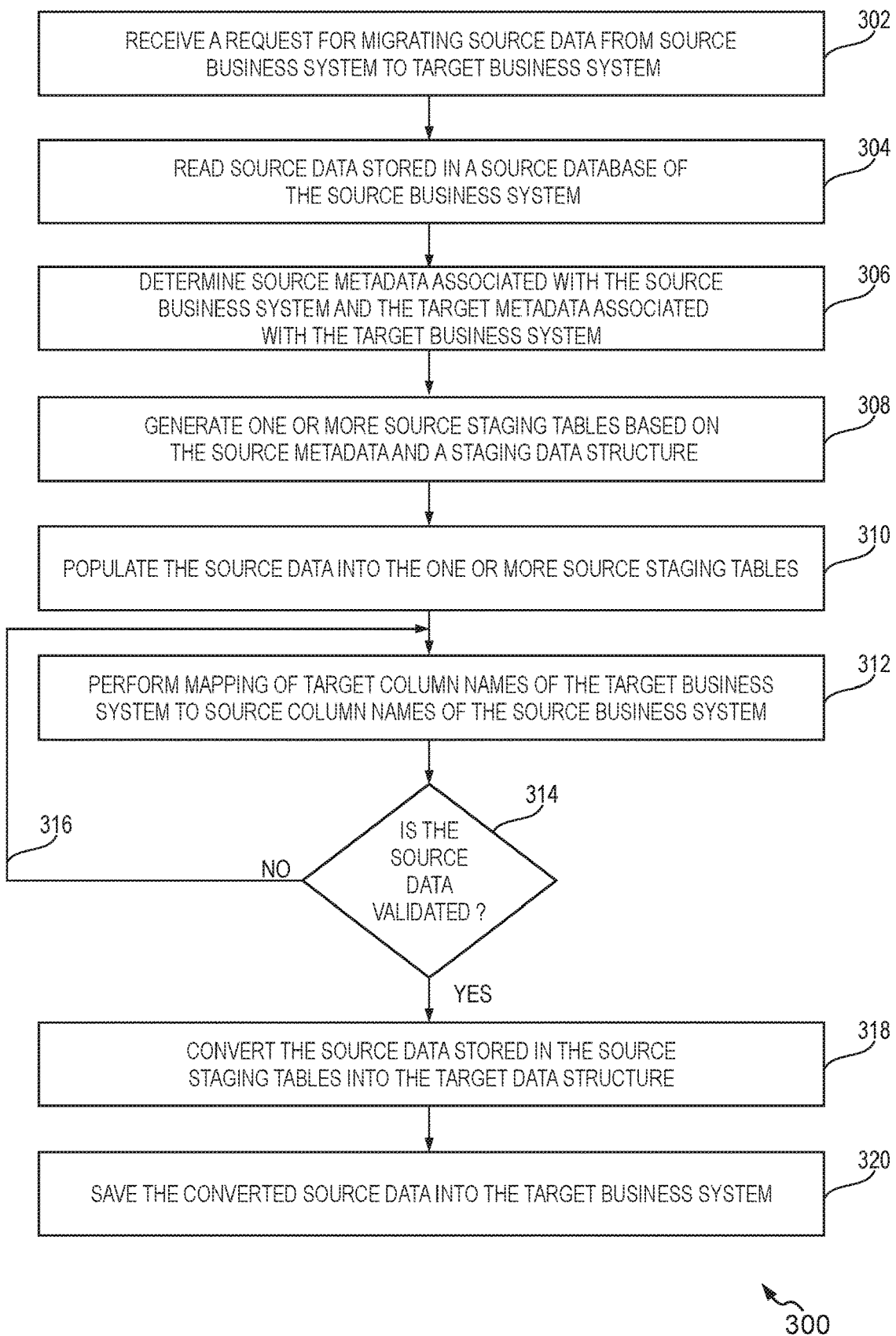
FIG. 3 is a flow chart for migrating source data from a source business system to a target business system, in accordance with an embodiment of the present disclosure.

FIG. 3 represents a flow chart 300 for a process flow for migrating source data from a source system to a target cloud system, in accordance with an embodiment of the present disclosure. It should be appreciated that each operation explained in the flow chart 300 is performed by the server system 200. The sequence of operations of the flow chart 300 may not be necessarily executed in the same order as they are presented. Further, one or more operations may be grouped together and performed in form of a single step, or one operation may have several sub-steps that may be performed in parallel or in a sequential manner.

At 302, the server system 20 receives a request for migrating source data from the source business system 106 to the target business system 110. The request defines a migration work definition, and defines users associated with content to be migrated. For example, a user 116 accesses a web based interface to the data migration application 118 via the user device 114 to create the migration work definition for migrating five suppliers documents from the source business system (for example, ERP system). The user 116 may access a web based interface to the data migration application 118 via the user device 114 to also initiate migration jobs and view reports. Although this example uses only one supplier data type to illustrate a migration of content, enterprise resource planning (ERP) systems may have hundreds of different document types.

At 304, the server system 200 reads source data stored in a source database of the source business system 106. The source data may include multiple source entity records. It is noted that source entity records can be formatted according to an unknown schema and it can be a de-normalized schema as well.

At 306, the server system 200 determines source metadata associated with the source business system 106 and target metadata associated with the target business system 110. The source metadata may include pointers to different tables, column definitions, etc. associated with the source data. The target metadata may include information such as pointers to different tables, and column definitions for a particular object (for example, Supplier).

At 308, the server system 200 generates one or more source staging tables based on the source metadata and a staging data structure. The one or more source staging tables indicate source columns that are to be mapped in the target business system 110. The source staging tables are structure-agnostic staging tables that can be used for migrating data from the source business system 106 to the target business system 110. It is noted that, during this process, the server system 200 can perform a variety of different processing operations as well. For example, the server system 200 can perform conversions or transformations on the source data, prior to storing it in the source staging tables. Some examples of conversions, transformations, or other processing steps include converting a source entity record from a delimited record to a fixed record, or vice versa.

At 310, the server system 200 populates the source data into the one or more source staging tables.

At 312, the server system 200 performs mapping of target column names of the target business system 110 to source column names of the source business system 106. The mapping is performed based on the one or more source staging tables. The mapping may be done using at least one of mapping methods including, but not limited to, as is mapping, one to one mapping, two to one mapping, three to one mapping, SQL formula based mapping, constant mapping, prefix mapping, suffix mapping, and the like.

The server system 200 creates mapping sets to map source data of the source business system 106 to target data to be stored in the target business system 110. The mapping sets include target metadata that are mapped onto, from the source data. In one embodiment, the server system 200 also generates a target cloud Column sequence as per cloud version of the target cloud 108 used for FBDI (File Based Data Import) creation.

At 314, the server system 200 validates the source data based on the mapping sets. The validation can be performed in a variety of different ways as well. In one embodiment, it is performed at the field level, at the record level, or at another level. The server system 200 illustratively validates the source data against referential data that already exists in target business system 110. The result of the validation may be successful or failure.

At 316, when the validation of the source data is failed, the server system 200 resolves the mapping process and the process moves back to the step 312.

At 318, when the validation of the source data is successful, the server system 200 converts the source data stored in the source staging tables into the target data structure.

At 320, the server system 200 saves the converted source data into the target business system 110. During copying of the source data to target business system 110, the server system 200 can perform processing steps on the data as well. It should also be noted that copying the source data from source staging tables to target business system 110 can be done in a wide variety of different ways as well. For instance, the inserts can be done row by row, or assets or groups. The map can be read a single mapping at a time, or multiple mappings at a time, and the data migration can be performed accordingly.

FIG. 4 shows an example representation of metadata table 400 of a source business system (e.g., ERP system), in accordance with an embodiment of the present disclosure. The metadata table 400 is related with supplier data of an organization.

The source business system 106 stores multiple source entity records where each source entity record is illustratively a business record associated with an entity in source business system 106. There are a wide variety of different types of entities, such as a customer entity that represents a customer, a vendor entity that represents a vendor, an invoice entity that represents an invoice, a product entity that represents a product, etc.

The metadata table 400 includes multiple columns such as table name 402, column name 404 (for example, Party_Number), user column name 406, column width 408, etc. In one embodiment, the metadata table 400 can also be automatically loaded using pre-configured adaptors for source business system 106.

FIG. 5 shows a graphical user interface (GUI) 500 for creating a source staging table based on the metadata of the source business system 106, in accordance with an embodiment of the present disclosure. As mentioned earlier, the processor 206 is configured generate the one or more source staging tables based on the source metadata using the data migration application.

The GUI 500 includes a template header field 502 including template name, POD name, project name, parent object code, metadata table name. For creating the source staging table, the user provides inputs to various data fields of the template header field 502. The template name represents a name of the source template to be created. The metadata table name indicates the name of the source metadata table, which metadata is imported/loaded into the data migration application. Thereafter, the user clicks on "create table" button to create source staging table using the metadata of the source metadata table name with unique name (i.e., source metadata table name appended with "POD ID") and the user clicks on "import columns" button that displays all the related columns of the respective source staging table in template lines.

The GUI 500 further includes a column name field 504, selection field 506, OrigTransRef (Original Transaction Reference) field 508, and mapping type field 510. These fields selected accordingly prepares a certain type of data that is used to perform mapping of data. The column name field 504 includes different column name fields of the source such as party-number, vendor-name, vendor-id, Alias, etc. The selection field 506 indicates what all the source columns need to be mapped based on the source metadata. The tick mark affirms that a particular column name is selected for mapping. The GUI 500 provides a baseline depicting source staging table associated with the source business system 106.

The OrigTransRef field 508 provides an option for selecting source columns to create a transaction reference for reconciliation. The column names selected to create the OrigTransRef references the original transaction of the source data at the time of reconciliation. The process of finding errors is based on referring the converted source data with the original transacted data of the source business system 106.

The mapping type field 510 displays the type of mapping that should be performed on a particular source column of the source business system 106. In this scenario "as is" mapping is selected for all the column names of the source business system.

Figure 6:
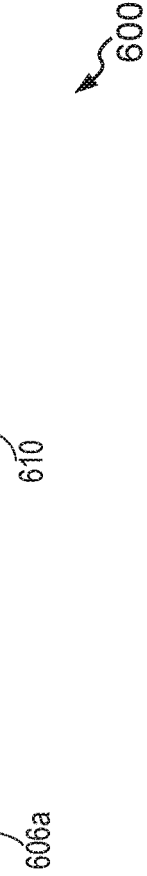
FIG. 6 shows a graphical user interface (GUI) for mapping the source column names to target column names included in the target metadata, in accordance with an embodiment of the present disclosure.

FIG. 6 shows a graphical user interface (GUI) 600 for mapping the source column names to target column names included in the target metadata, in accordance with an embodiment of the present disclosure.

A table 602 is shown in the GUI 600. The table 602 includes cloud column name field 604, source column name field 606, mapping type field 608, etc. The cloud name field 604 indicates column names included in the target metadata. The source column name field 606 indicates source columns included in the source metadata. By selecting the mapping field for the first row, a drop-down menu list 610 is displayed. The drop-down menu list 610 includes various mapping method such as "as is" mapping, one to one mapping, two to one mapping, three to one mapping, SQL formula based mapping, constant mapping, prefix mapping, suffix mapping, and the like.

For example, a cloud name field 604a (see, vendor_type_lookup_code) is mapped to the source name field 606a with one-to-one mapping relation.

To create target staging table, the user provides inputs to data fields of template header and creates a cloud staging table based on cloud metadata. The user selects cloud column names which are needed for migrating from template lines. In the template lines, a list of columns of the source staging table of respective selected source template will be available in "source column name field 606", out of which the source column is mapped to the cloud column for conversion/migration. The user selects mapping type field 608 for each source-cloud pair and based on the mapping types, the conversion process is initiated for converting the source data to the target cloud data.

FIG. 7 shows a graphical user interface (GUI) 700 for displaying mapping sets, in accordance with an embodiment of the present disclosure.

As mentioned earlier, the server system 200 creates mapping sets to map source data of the source business system 106 to target metadata of the target business system 110. The mapping sets include target metadata that are mapped onto, from the source data. The server system 200 generates the mapping sets that maps the copy of a source object included in the source metadata to a target object included in the target metadata. Each source object field as shown in a column (see, 704) of a mapping table 702 is mapped to a particular cloud value field as shown in a column (see, 706).

Figure 8:
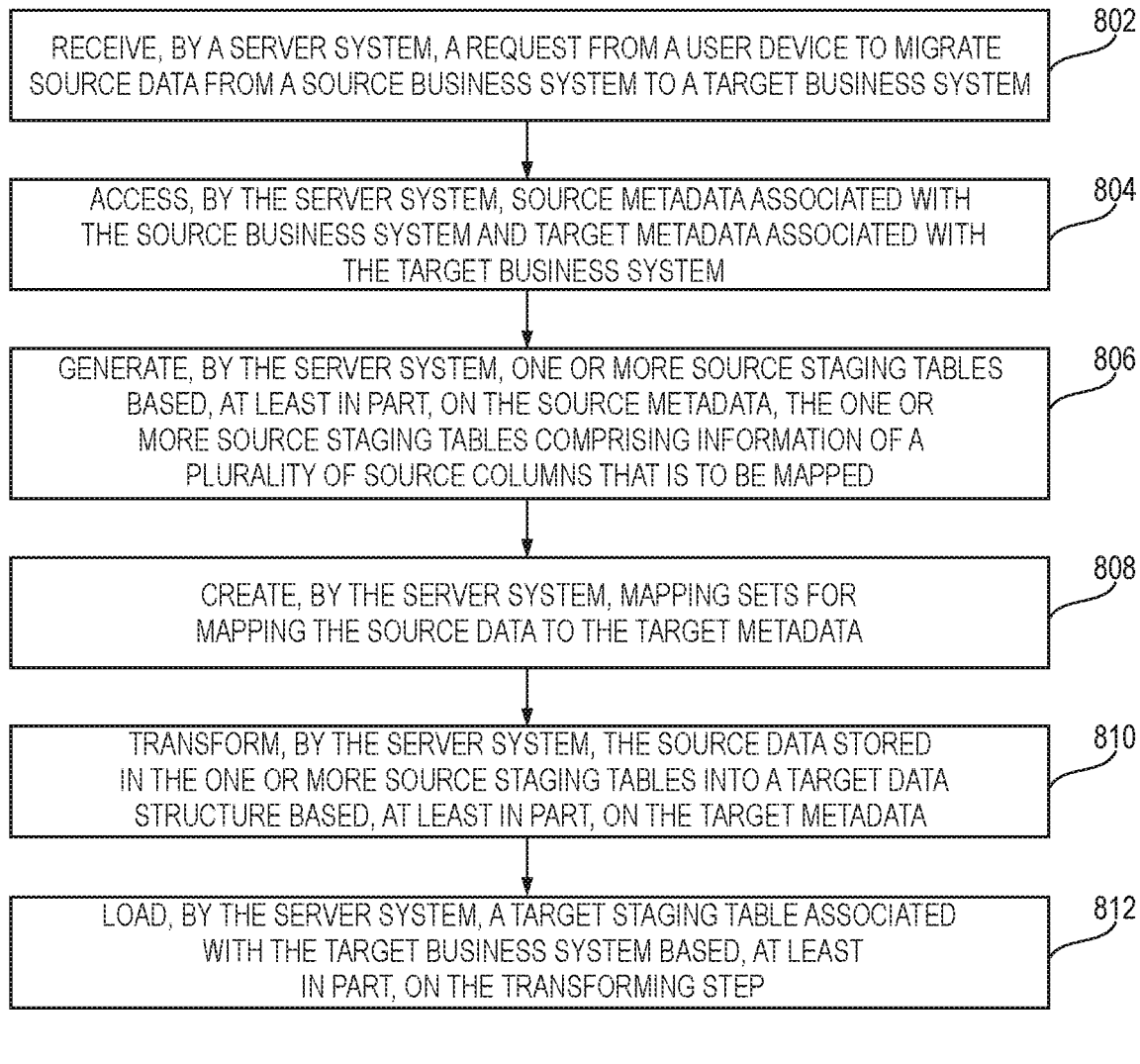
FIG. 8 is a flow diagram of a computer-implemented method for migrating source data from a source system to a target cloud system, in accordance with an embodiment of the present disclosure.

FIG. 8 is a flow diagram of a computer-implemented method 800 for business data migration, in accordance with an embodiment of the present disclosure. The method 800 depicted in the flow diagram may be executed by the server system 102 which may be standalone server or a server as whole incorporated in another server system. Operations of the method 800, and combinations of operation in the method 800, may be implemented by, for example, hardware, firmware, a processor, circuitry and/or a different device associated with the execution of software that includes one or more computer-program instructions.

At operation 802, the method 800 includes receiving a request from a user device to migrate source data from a source business system 106 to a target business system 110.

At operation 804, the method 800 includes accessing source metadata associated with the source business system 106 and target metadata associated with the target business system 110.

At 806, the method 800 includes generating one or more source staging tables based, at least in part, on the source metadata. The one or more source staging tables include information of a plurality of source columns that is to be mapped.

At 808, the method 800 includes creating mapping sets for mapping the source data to the target metadata.

At 810, the method 800 includes transforming the source data stored in the one or more source staging tables into a target data structure based, at least in part, on the target metadata.

At 812, the method 800 includes loading a target staging table associated with the target business system based, at least in part, on the transforming step.

Figure 9:
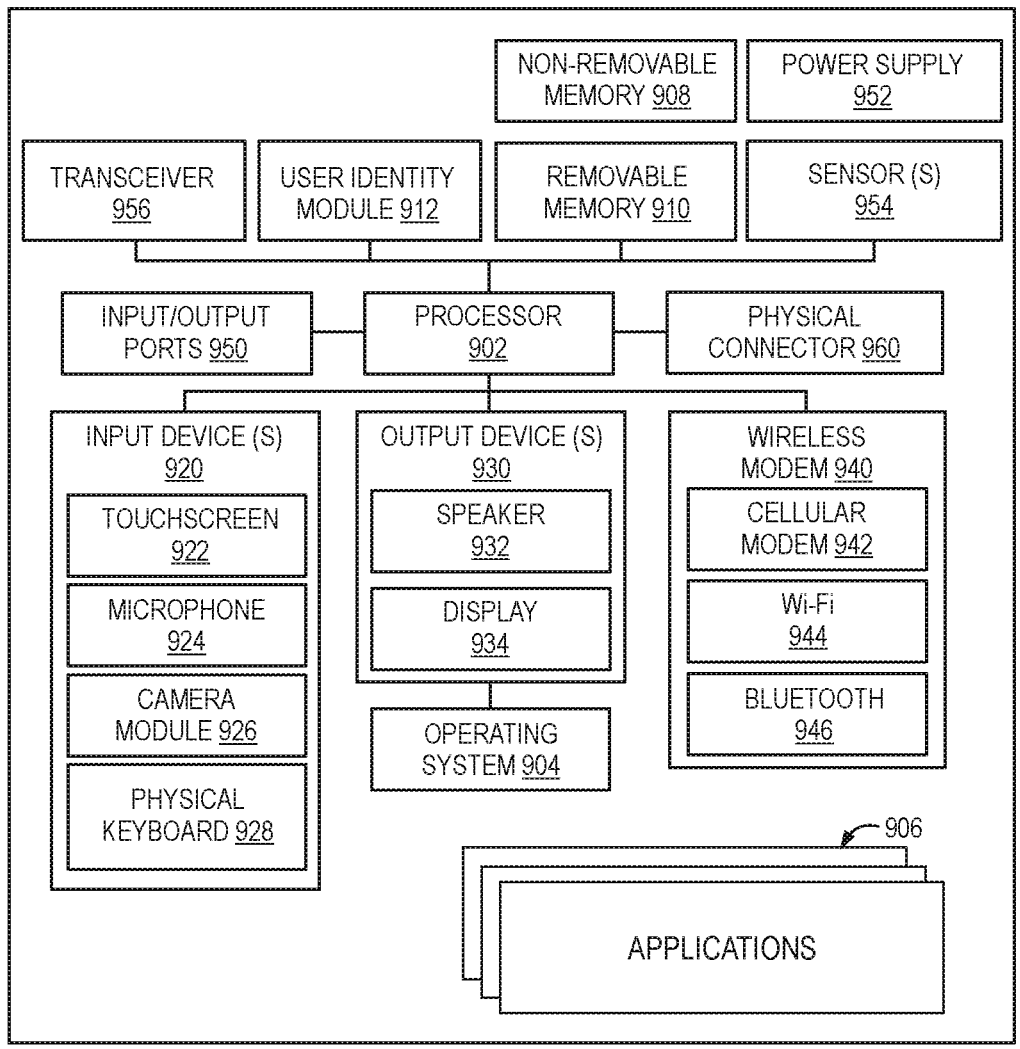
FIG. 9 is a simplified block diagram of an electronic device capable of implementing various embodiments of the present disclosure.

FIG. 9 is a simplified block diagram of an electronic device 900 capable of implementing the various embodiments of the present disclosure. The electronic device 900 may be an example of the one of the user device 114 shown in FIG. 1. It should be understood that the electronic device 900 as illustrated and hereinafter described is merely illustrative of one type of device and should not be taken to limit the scope of the embodiments. As such, it should be appreciated that at least some of the components described below in connection with the electronic device 900 may be optional and thus in an example embodiment may include more, less, or different components than those described in connection with the example embodiment of the FIG. 9. As such, among other examples, the electronic device 900 could be any of an electronic device or may be embodied in any of the electronic devices, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 900 includes a controller or a processor 902 (e.g., a signal processor, microprocessor, ASIC, or other control and processing logic circuitry) for performing such tasks as signal coding, data processing, image processing, input/output processing, power control, and/or other functions. An operating system 904 controls the allocation and usage of the components of the electronic device 900 and provides support for one or more programs such as data migration from source business system to target business system. The electronic device 900 is depicted to include one or more applications such as applications 906 facilitated by the server system 102. The applications 906 (e.g., data migration application) can be an instance of an application downloaded from the server system 102 or a third-party server. The applications 906 are capable of communicating with the server system 102 for facilitating interpreting of the payload data encoded in the QR-URI of a website or a product. The applications may include common computing applications (e.g., telephony applications, email applications, calendars, contact managers, web browsers, messaging applications such as USSD messaging or SMS messaging or SIM Tool Kit (STK) application) or any other computing application.

The illustrated electronic device 900 includes one or more memory components, for example, a non-removable memory 908 and/or a removable memory 910. The non-removable memory 908 and/or the removable memory 910 may be collectively known as storage device/module in an embodiment. The non-removable memory 908 can include RAM, ROM, flash memory, a hard disk, or other well-known memory storage technologies. The removable memory 910 can include flash memory, smart cards, or a Subscriber Identity Module (SIM). The one or more memory components can be used for storing data and/or code for running the operating system 904. The electronic device 900 may further include a user identity module (UIM) 912. The UIM 912 may be a memory device having a processor built-in. The UIM 912 may include, for example, a subscriber identity module (SIM), a universal integrated circuit card (UICC), a universal subscriber identity module (USIM), a removable user identity module (R-UIM), or any other smart card. The UIM 912 typically stores information elements related to a mobile subscriber. The UIM 912 in form of the SIM card is well known in Global System for Mobile (GSM) communication systems, Code Division Multiple Access (CDMA) systems, or with third-generation (3G) wireless Communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 900 can support one or more input devices 920 and one or more output devices 930. Examples of the input devices 920 may include, but are not limited to, a touch screen/a display screen 922 (e.g., capable of capturing finger tap inputs, finger gesture inputs, multi-finger tap inputs, multi-finger gesture inputs, or keystroke inputs from a virtual keyboard or keypad), a microphone 924 (e.g., capable of capturing voice input), a camera module 926 (e.g., capable of capturing still picture images and/or video images) and a physical keyboard 928. Examples of the output devices 930 may include, but are not limited to, a speaker 932 and a display 934. Other possible output devices can include piezoelectric or other haptic output devices. Some devices can serve more than one input/output function. For example, the touch screen 922 and the display 934 can be combined into a single input/output device.

A wireless modem 940 can be coupled to one or more antennas (not shown in the FIG. 9) and can support two-way communications between the processor 902 and external devices, as is well understood in the art. The wireless modem 940 is shown generically and can include, for example, a cellular modem 942 for communicating at long range with the mobile communication network, a Wi-Fi compatible modem 944 for communicating at short range with an external Bluetooth-equipped device or a local wireless data network or router, and/or a Bluetooth-compatible modem 946. The wireless modem 940 is typically configured for communication with one or more cellular networks, such as a GSM network for data and voice communications within a single cellular network, between cellular networks, or between the electronic device 900 and a public switched telephone network (PSTN).

The electronic device 900 can further include one or more input/output ports 950, a power supply 952, one or more sensors 954 for example, an accelerometer, a gyroscope, a compass, a global positioning system sensor (for providing location details) or an infrared proximity sensor for detecting the orientation or motion of the electronic device 900, a transceiver 956 (for wirelessly transmitting analog or digital signals) and/or a physical connector 960, which can be a USB port, IEEE 1294 (FireWire) port, and/or RS-232 port. The illustrated components are not required or all-inclusive, as any of the components shown can be deleted and other components can be added.

The disclosed method with reference to FIG. 8, or one or more operations of the method 800 may be implemented using software including computer-executable instructions stored on one or more computer-readable media (e.g., non-transitory computer-readable media, such as one or more optical media discs, volatile memory components (e.g., DRAM or SRAM)), or non-volatile memory or storage components (e.g., hard drives or solid-state non-volatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 200 and its various components such as the computer system 202 and the database 204 may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
receiving, by a server system, a request from a user device to migrate source data from a source business system to a target business system;
accessing, by the server system, source metadata stored in a source database associated with the source business system and target metadata associated with the target business system;
generating, by the server system, one or more source staging tables based, at least in part, on the source metadata, and a staging data structure, wherein the one or more source staging tables comprising information of a plurality of source columns associated with the source metadata that is to be mapped in the target business system;
creating, by the server system, mapping sets for mapping the source data to the target metadata, based, at least in part on the one or more source staging tables;
transforming, by the server system, the source data stored in the one or more source staging tables into a target data structure based, at least in part, on the target metadata after successful validation of the source metadata;
loading, by the server system, a target staging table associated with the target business system based, at least in part, on the transforming step and automatically accessing a control file containing the required field sequencing based on the target business system's accepted format to configure the one or more staging tables appropriately;
saving, by the server system, the converted source metadata in the target data structure of the target business system; and
re-using, by the server system, the one or more source staging tables of the source business system for the process of conversion and validation to the target business system.

2. The computer-implemented method as claimed in claim 1, further comprising:
transporting, by the server system, target data files into a database associated with the target business system based, at least in part, on the target staging table and an interface table.

3. The computer-implemented method as claimed in claim 1, further comprising:
mapping, by the server system, column names in the target business system against column names in the source business system based, at least in part, on the one or more source staging tables.

4. The computer-implemented method as claimed in claim 3, wherein the mapping is one of: one to one mapping, two to one mapping, three to one mapping, constant mapping, prefix mapping and suffix mapping.

5. The computer-implemented method as claimed in claim 1, further comprising:
validating, by the server system, the source data based, at least in part, on the mapping sets and the target metadata.

6. The computer-implemented method as claimed in claim 1, further comprising:
populating, by the server system, the source data into the one or more source staging tables.

7. The computer-implemented method as claimed in claim 1, wherein the one or more source staging tables are in staging data structure which is structure-agnostic.

8. The computer-implemented method as claimed in claim 1, wherein the source business system is an enterprise resource planning (ERP) system and the target business system is an Oracle cloud application.

9. A server system, comprising:
a communication interface;
a memory comprising executable instructions; and
a processor communicably coupled to the communication interface and configured to execute the instructions to cause the server system to at least:
receive a request from a user device to migrate source data from a source business system to a target business system,
access source metadata stored in a source database associated with the source business system and target metadata associated with the target business system,
generate one or more source staging tables based, at least in part, on the source metadata, and a staging data structure, wherein the one or more source staging tables comprising information of a plurality of source columns associated with the source metadata that is to be mapped in the target business system,
create mapping sets for mapping the source data to the target metadata, based, at least in part on the one or more source staging tables,
transform the source data stored in the one or more source staging tables into a target data structure based, at least in part, on the target metadata after successful validation of the source metadata,
load a target staging table associated with the target business system based, at least in part, on the transformation and automatically access a control file containing the required field sequencing based on the target business system's accepted format to configure the one or more staging tables appropriately,
save the converted source metadata in the target data structure of the target business system, and
re-using, by the server system, the one or more source staging tables of the source business system for the process of conversion and validation to the target business system.

10. The server system as claimed in claim 9, wherein the server system is further caused to transport target data files into a database associated with the target business system based, at least in part, on the target staging table and an interface table.

11. The server system as claimed in claim 9, wherein the server system is further caused to map column names in the target business system against column names in the source business system based, at least in part, on the one or more source staging tables.

12. The server system as claimed in claim 11, wherein the mapping is one of: one to one mapping, two to one mapping, three to one mapping, constant mapping, prefix mapping and suffix mapping.

13. The server system as claimed in claim 9, wherein the server system is further caused to validate the source data based, at least in part, on the mapping sets and the target metadata.

14. The server system as claimed in claim 9, wherein the server system is further caused to populate the source data into the one or more source staging tables.

15. The server system as claimed in claim 9, wherein the one or more source staging tables are in staging data structure which is structure-agnostic.

16. The server system as claimed in claim 9, wherein the source business system is an enterprise resource planning (ERP) system and the target business system is an Oracle cloud application.

17. A computer-implemented method for business data migration, the computer implemented method comprising:
receiving, by a server system, a request from a user device to migrate source data from a source business system to a target business system;
accessing, by the server system, source metadata stored in a source database associated with the source business system and target metadata associated with the target business system;
generating, by the server system, one or more source staging tables based, at least in part, on the source metadata, and a staging data structure, wherein the one or more source staging tables comprising information of a plurality of source columns associated with the source metadata that is to be mapped in the target business system;
creating, by the server system, mapping sets for mapping the source data to the target metadata based, at least in part on the one or more source staging tables;
transforming, by the server system, the source data stored in the one or more source staging tables into a target data structure based, at least in part, on the target metadata;
validating, by the server system, the source data based, at least in part, on the mapping sets and the target metadata;
loading, by the server system, a target staging table associated with the target business system based, at least in part, on the transforming step and automatically accessing a control file containing the required field sequencing based on the target business system's accepted format to configure the one or more staging tables appropriately;
saving, by the server system, the converted source metadata in the target data structure of the target business system; and
re-using, by the server system, the one or more source staging tables of the source business system for the process of conversion and validation to the target business system.

18. The computer-implemented method as claimed in claim 17, further comprising:
populating, by the server system, the source data into the one or more source staging tables.

19. The computer-implemented method as claimed in claim 17, wherein the one or more source staging tables are script-free staging tables.

20. The computer-implemented method as claimed in claim 17, wherein the source business system is an enterprise resource planning (ERP) system and the target business system is an Oracle cloud application.

* * * * *